(12) United States Patent
Hurst et al.

(10) Patent No.: US 8,837,699 B2
(45) Date of Patent: Sep. 16, 2014

(54) METHODS AND APPARATUS TO MONITOR SUBSCRIBER ACTIVITY

(75) Inventors: Jennifer Ann Hurst, Lexington, KY (US); Eric Fogle, Ashland, MO (US); Paul Stoffel, San Francisco, CA (US); Alison LeBreton, Atlanta, GA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1289 days.

(21) Appl. No.: 12/243,699

(22) Filed: Oct. 1, 2008

(65) Prior Publication Data

US 2010/0080369 A1 Apr. 1, 2010

(51) Int. Cl.
*H04M 3/42* (2006.01)
*H04M 11/00* (2006.01)
*H04Q 3/00* (2006.01)
*G06Q 30/02* (2012.01)

(52) U.S. Cl.
CPC ........... *H04M 3/42297* (2013.01); *H04Q 3/005* (2013.01); *G06Q 30/0201* (2013.01)
USPC ..................................... 379/201.01; 455/405

(58) Field of Classification Search
USPC ..................................... 379/201.01; 455/405
See application file for complete search history.

(56) References Cited

U.S. PATENT DOCUMENTS

| | | | |
|---|---|---|---|
| 5,661,792 A | 8/1997 | Akinpelu et al. | |
| 5,822,410 A | 10/1998 | McCausland et al. | |
| 5,903,625 A | 5/1999 | May | |
| 6,006,085 A | 12/1999 | Balachandran | |
| 6,028,914 A | 2/2000 | Lin et al. | |
| 6,049,599 A | 4/2000 | McCausland et al. | |
| 6,169,793 B1 | 1/2001 | Godwin et al. | |
| 6,169,896 B1 | 1/2001 | Sant et al. | |
| 6,178,451 B1 | 1/2001 | Huitema et al. | |
| 6,192,115 B1 | 2/2001 | Toy et al. | |

(Continued)

FOREIGN PATENT DOCUMENTS

| | | |
|---|---|---|
| EP | 1309207 | 5/2003 |
| WO | 9818270 | 4/1998 |

(Continued)

OTHER PUBLICATIONS

United States Patent and Trademark Office, "Notice of Abandonment," issued in connection with U.S. Appl. No. 11/527,219, on Jan. 8, 2010 (2 pages).

(Continued)

*Primary Examiner* — Rasha Al Aubaidi
(74) *Attorney, Agent, or Firm* — Hanley, Flight & Zimmerman, LLC.

(57) ABSTRACT

Methods and apparatus to respond to monitor subscriber activity are disclosed. An example method includes receiving a first set of client telephone number (TN) data associated with a client and a current time period, and receiving a second set of client TN data associated with a prior time period. The example method also includes receiving a first set of subscriber activity data associated with the current time period, identifying a TN that is in the first set of subscriber activity data and is absent from at least one of the first or second sets of client TN data, and identifying the TN with at least one of a new inroad for a competitor or a new inroad for the client based on at least one activity code from the first set of subscriber activity data.

22 Claims, 8 Drawing Sheets

(56) References Cited

U.S. PATENT DOCUMENTS

| | | |
|---|---|---|
| 6,298,352 B1 | 10/2001 | Kannan et al. |
| 6,301,471 B1 | 10/2001 | Dahm et al. |
| 6,411,807 B1 | 6/2002 | Amin et al. |
| 6,487,390 B1 | 11/2002 | Virine et al. |
| 6,493,558 B1 | 12/2002 | Bernhart et al. |
| 6,516,189 B1 | 2/2003 | Frangione et al. |
| 6,556,992 B1 | 4/2003 | Barney et al. |
| 6,597,903 B1 | 7/2003 | Dahm et al. |
| 6,618,587 B1 | 9/2003 | Ghafoor |
| 6,625,269 B1 | 9/2003 | Kim |
| 6,636,868 B1 | 10/2003 | Bauer et al. |
| 6,751,295 B2 | 6/2004 | McCulley et al. |
| 6,754,470 B2 | 6/2004 | Hendrickson et al. |
| 6,775,262 B1 | 8/2004 | Skog et al. |
| 6,788,926 B1 | 9/2004 | Frangione et al. |
| 6,832,211 B1 | 12/2004 | Thomas et al. |
| 7,003,306 B2 | 2/2006 | Henry-Labordere |
| 7,058,412 B2 | 6/2006 | Lowe et al. |
| 7,133,916 B2 | 11/2006 | Schunemann |
| 7,139,246 B2 | 11/2006 | Harris et al. |
| 7,190,969 B1 | 3/2007 | Oh et al. |
| 7,243,127 B2 | 7/2007 | Tabayoyon, Jr. et al. |
| 7,248,862 B2 | 7/2007 | Minborg et al. |
| 7,366,515 B2 | 4/2008 | Zhao et al. |
| 7,369,865 B2 | 5/2008 | Gabriel et al. |
| 7,599,681 B2 | 10/2009 | Link, II et al. |
| 7,761,088 B1 | 7/2010 | Hannan et al. |
| 7,933,392 B1 | 4/2011 | Hannan et al. |
| 8,031,856 B2 | 10/2011 | Mikleton et al. |
| 8,279,852 B2 | 10/2012 | Lu et al. |
| 8,280,369 B1 | 10/2012 | Reeves et al. |
| 8,369,826 B2 | 2/2013 | Alla |
| 8,433,047 B2 | 4/2013 | Hannan et al. |
| 2001/0053688 A1 | 12/2001 | Rignell et al. |
| 2002/0016731 A1 | 2/2002 | Kupersmit |
| 2002/0023003 A1 | 2/2002 | Raheman |
| 2002/0069037 A1 | 6/2002 | Hendrickson et al. |
| 2002/0111809 A1* | 8/2002 | McIntosh ............ 704/273 |
| 2003/0013439 A1 | 1/2003 | Daniel et al. |
| 2003/0023571 A1 | 1/2003 | Barnhill |
| 2003/0061152 A1 | 3/2003 | De et al. |
| 2003/0064722 A1 | 4/2003 | Frangione et al. |
| 2003/0088491 A1 | 5/2003 | Liu et al. |
| 2003/0190015 A1 | 10/2003 | McCulley et al. |
| 2003/0200135 A1 | 10/2003 | Wright |
| 2003/0229534 A1 | 12/2003 | Frangione et al. |
| 2003/0236694 A1 | 12/2003 | Liu et al. |
| 2004/0097245 A1 | 5/2004 | Sheth et al. |
| 2005/0043011 A1 | 2/2005 | Murray et al. |
| 2005/0107066 A1 | 5/2005 | Erskine et al. |
| 2005/0111640 A1 | 5/2005 | Moisey et al. |
| 2005/0271029 A1 | 12/2005 | Iffland |
| 2006/0023854 A1 | 2/2006 | Moisan et al. |
| 2006/0109846 A1 | 5/2006 | Lioy et al. |
| 2006/0135161 A1 | 6/2006 | Jiang et al. |
| 2007/0099635 A1 | 5/2007 | Mohanty et al. |
| 2007/0121603 A1 | 5/2007 | Clark, III et al. |
| 2007/0156673 A1 | 7/2007 | Maga et al. |
| 2007/0165613 A1 | 7/2007 | Soo et al. |
| 2007/0185867 A1 | 8/2007 | Maga et al. |
| 2008/0176535 A1 | 7/2008 | Cai |
| 2008/0182553 A1 | 7/2008 | Salkini et al. |
| 2008/0228557 A1 | 9/2008 | Sepehri-Nik et al. |
| 2010/0036809 A1 | 2/2010 | Gerster et al. |
| 2010/0057812 A1 | 3/2010 | Moisan et al. |
| 2010/0074431 A1 | 3/2010 | Enzmann et al. |
| 2010/0091975 A1 | 4/2010 | Sheth et al. |
| 2010/0167689 A1 | 7/2010 | Sepehri-Nik et al. |
| 2011/0158171 A1 | 6/2011 | Centonza et al. |
| 2011/0276366 A1 | 11/2011 | Goyet et al. |
| 2012/0084430 A1 | 4/2012 | Lu |
| 2013/0064242 A1 | 3/2013 | Lu et al. |

FOREIGN PATENT DOCUMENTS

| | | |
|---|---|---|
| WO | 0039981 | 7/2000 |
| WO | 0056098 | 9/2000 |
| WO | 0219625 | 3/2002 |
| WO | 02071674 | 9/2002 |
| WO | 2007081424 | 7/2007 |
| WO | 2008112352 | 9/2008 |

OTHER PUBLICATIONS

United States Patent and Trademark Office, "Final Office Action," issued in connection with U.S. Appl. No. 10/237,478, on Oct. 2, 2009 (22 pages).

European Patent Office, "Extended European Search Report," issued in connection with European Patent Application Serial No. 09012468.6, on Jan. 26, 2010 (6 pages).

Qualcomm, "Handling SMS in BREW," Article retrieved from www.qualcomm.com, on Aug. 30, 2007 (3 pages).

Palm, Inc., "SMS Handbook," 2001 (24 pages).

Vougioukas et al., "A System for Basic-Level Network Fault Management Based on the GSM Short Message Service (SMS)," In: Proceedings of EUROCON'2001 International Conference on Trends in Communications, vol. 1, pp. 218-222 (5 pages).

United States Patent and Trademark Office, "Notice of Allowance," issued in connection with U.S. Appl. No. 11/486,498, on Feb. 19, 2010 (4 pages).

United States Patent and Trademark Office, "Non-Final Office Action," issued in connection with U.S. Appl. No. 12/406,538, mailed Sep. 12, 2011, 51 pages.

State Intellectual Property Office, P.R. China, "First Office Action," with English translation, issued in connection with Chinese application serial No. 201010206959, issued Dec. 16, 2011, 11 pages.

United States Patent and Trademark Office, "Non-Final Office Action," issued in connection with U.S. Appl. No. 12/243,633, mailed Dec. 6, 2011, 12 pages.

European Patent Office, Communication with European Search Report for EP Application No. 09012467.8, dated Mar. 23, 2010, 7 pages.

Patent Office of the People's Republic of China, Notification to Grant Patent Right for Invention for CN Application No. 03812238.3, issued Mar. 24, 2010, 3 pages.

Korean Intellectual Property Office, Non-Final Rejection issued for KR Application No. 10-2004-7015715, dated Nov. 10, 2009, 8 pages.

Korean Intellectual Property Office, Final Rejection issued for KR Application No. 10-2004-7015715, dated Apr. 12, 2010, 6 pages.

United States Patent and Trademark Office, Notice of Allowance issued for U.S. Appl. No. 11/486,498, mailed Apr. 20, 2010, 14 pages.

United States Patent and Trademark Office, Office Action issued for U.S. Appl. No. 11/445,069, dated May 10, 2010, 13 pages.

Office Action for U.S. Appl. No. 11/486,498, issued on Apr. 3, 2009, 8 pages.

Office Action for U.S. Appl. No. 11/527,219, issued on Dec. 15, 2008, 8 pages.

Office Action for U.S. Appl. No. 10/237,478, issued on Feb. 17, 2009, 16 pages.

Office Action for U.S. Appl. No. 10/237,478, issued on Nov. 14, 2008, 3 pages.

Office Action for U.S. Appl. No. 10/237,478, issued on Sep. 12, 2008, 19 pages.

Office Action for U.S. Appl. No. 10/237,478, issued on Jan. 4, 2008, 15 pages.

Office Action for U.S. Appl. No. 10/237,478, issued on Apr. 19, 2007, 6 pages.

Office Action for U.S. Appl. No. 10/263,782, issued on May 21, 2003, 10 pages.

EP Office Action issued for EP application 03719560.9, issued on Oct. 8, 2008, 3 pages.

CN Office Action issued for CN 03812238.3, issued on Jan. 18, 2008, 11 pages.

CA Office Action issued for CA application 2,481,203, issued on Dec. 4, 2007, 3 pages.

(56) References Cited

OTHER PUBLICATIONS

JP Office Action issued for JP application P2003-583001, issued on Sep. 30, 2008, 4 pages.
CN Office Action issued for CN application 01816436.6, issued Dec. 9, 2005, 6 pages.
Vougioukas and Manos Rouincliotis, System for Basic Level Network Fault Mgmt based on the GSM Short Message Service (SMS), Proceedings of EUROCON'2001 International Conference on Trends in Communications vol. 1, 2001, 1 page.
Telephia acquires Mspect, Adding SMS Monitoring to Its Wireless Data QoS Solution, Business Wire, Nov. 13, 2001, 2 pages.
Galaxy Phones, Mobile Phones—The Basics, internet article, www.galaxyphones.co.uk/mobile_phones_basics07.asp, Mar. 2, 2006, 4 pages.
Call Delivery, internet article, www.members.tripod.com, retrieved from internet on Feb. 1, 2006, 1 page.
NPA-NXX, North American Numbering Plan, internet article, voip-info.org, retrieved from internet on May 12, 2008, 3 pages.
Wikipedia, Network Switching Subsystem, internet article, retrieved from the internet on Mar. 2, 2006, 6 pages.
International Bureau, International Search Report for PCT/US03/18070, Aug. 29, 2003, 5 pages.
United States Patent and Trademark Office, "Notice of Allowance," issued in connection with U.S. Appl. No. 12/243,633, mailed May 29, 2012, 19 pages.
United States Patent and Trademark Office, "Final Office Action," issued in connection with U.S. Appl. No. 12/406,538, mailed Jun. 19, 2012, 18 pages.
United States Patent and Trademark Office, Office Action issued for U.S. Appl. No. 11/527,219, mailed on Jun. 24, 2009, 20 pages.
United States Patent and Trademark Office, "Notice of Allowance," issued in connection with U.S. Appl. No. 12/406,538, mailed Oct. 3, 2012, 17 pages.
United States Patent and Trademark Office, "Non-Final Office Action," issued in connection with U.S. Appl. No. 12/911,044, mailed Aug. 17, 2012, 25 pages.
United States Patent and Trademark Office, Notice of Allowance issued for U.S. Appl. No. 11/445,069, mailed Oct. 19, 2010, 8 pages.
United States Patent and Trademark Office, Office Action issued for U.S. Appl. No. 11/486,498, Notification Date Nov. 4, 2009, 20 pages.
European Patent Office, Communication issued in connection with EP 09012467.8, Oct. 27, 2010, 1 page.
European Patent Office, Communication issued in connection with EP 09012468.6, Nov. 8, 2010, 1 page.
United States Patent and Trademark Office, "Notice of Allowance," issued in connection with U.S. Appl. No. 12/911,044, mailed Jan. 8, 2013 29 pages.
United States Patent and Trademark Office, "Non-Final Office Action," issued in connection with U.S. Appl. No. 13/407,523, issued Dec. 3, 2012, 26 pages.
United States Patent and Trademark Office, "Notice of Allowance," issued in connection with U.S. Appl. No. 13/616,650 mailed on Apr. 28, 2014 (10 pages).
United States Patent and Trademark Office, "Non-Final Office Action," issued in connection with U.S. Appl. No. 13/616,650, mailed on Jan. 9, 2014 (6 pages).
United States Patent and Trademark Office, "Notice of Allowance," issued in connection with U.S. Appl. No. 10/237,478, mailed on Feb. 27, 2013 (11 pages).
United States Patent and Trademark Office. "Notice of Allowance," issued in connection with U.S. Appl. No. 10/237,478, mailed on Sep. 26, 2013 (11 pages).
United States Patent and Trademark Office, "Non-Final Office Action," issued in connection with U.S. Appl. No. 13/757,255, mailed on Aug. 9, 2013 (9 pages).
United States Patent and Trademark Office, "Final Office Action," issued in connection with U.S. Appl. No. 13/757,255, mailed on Dec. 6, 2013 (7 pages).
United States Patent and Trademark Office, "Notice of Allowance," issued in connection with U.S. Appl. No. 13/757,255, mailed on Mar. 14, 2014 (8 pages).
State Intellectual Property Office of China, "Second Office Action," issued in connection with Chinese Patent Application No. 201010206959.2 on Dec. 4, 2012 (10 pages).

\* cited by examiner

METHODS AND APPARATUS TO MONITOR SUBSCRIBER ACTIVITY

FIELD OF THE DISCLOSURE

This disclosure relates generally to market research and, more particularly, to methods and apparatus to monitor subscriber activity.

BACKGROUND

Subscribers of telephone services enjoy a significant number of choices regarding which service provider to use. In many circumstances, the subscriber is not bound by lengthy contractual agreements that may otherwise inhibit the frequency at which a subscriber may change from one service provider to a competing service provider. Additionally, subscriber telecommunications providers changes or movement (e.g., changing from one provider to another) typically includes telephone number porting that permits the subscriber to retain their current telephone number even when switching from one service provider to a competing service provider.

As the volume of subscribers that decide to make a change regarding their telecommunication service provider increases, the difficulty in monitoring such change activity or movement also increases. For each subscriber change, corresponding changes occur for a directory listing, billing, and one or more changes to local number portability settings that permit the subscriber's number to be used with the competing service provider. Multiple third party data sources track or are otherwise informed of some of these subscriber changes, but administrators of such third party data sources are typically under no obligation to coordinate with others in an effort to provide a complete analysis of subscriber change details and/or activities.

DETAILED DESCRIPTION

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, or in any combination of hardware and software. Accordingly, while the following describes example methods, systems, and apparatus, persons having ordinary skill in the art will readily appreciate that the examples provided are not the only way to implement such methods, systems, and apparatus.

In the event a telecommunications service provider (also referred to herein as carriers) loses subscribers, the service provider is particularly interested in learning which competitors are taking their subscribers' market share, etc. On the other hand, in the event the service provider gains subscribers, the service provider is also interested in learning which competitors lost their business to them. For either situation, the service provider may initiate one or more studies to attribute such changes to one or more particular causes. In other words, while the effect of the loss or gain of subscribers is typically known by the service provider, the one or more corresponding causes that led-up to the loss or gain may not be clear.

A competitor may employ one or more marketing techniques to gain market share, such as running a promotion and/or advertising techniques. The desired effect of such marketing techniques is to increase market share, which typically occurs at the expense of other service providers competing for the same subscribers. In other circumstances, an increase or decrease in subscribers may be due to new corporate offices and/or businesses emerging and/or dissolving in a particular market area, which results in a corresponding need or surplus of telephone numbers associated with service.

Before a service provider can employ the one or more studies to ascertain why an increase or decrease in market share has occurred, knowledge of the service providers that are currently associated with telephone numbers is helpful. For example, a service provider may have a detailed list of their current subscribers and the telephone numbers associated with each subscriber, but may not know which service provider was previously associated with each telephone number. Alternatively, the service provider may not have a detailed list of current subscribers and/or recent disconnects. In either case, the methods and apparatus described herein permit the service provider to use available data source(s) to ascertain subscriber activity. In particular, if the service provider knew which competitive service provider was providing service prior to the gain of that subscriber, then the service provider may employ one or more studies that correlate an effectiveness of marketing activities. Similarly, if the service provider knew which competitive service provider has recently taken subscribers away, then the service provider may employ one or more studies to identify where a competitive marketing strategy is particularly effective, and/or whether a lack of the service provider's marketing efforts is the cause for the loss of subscribers.

Figure 1:
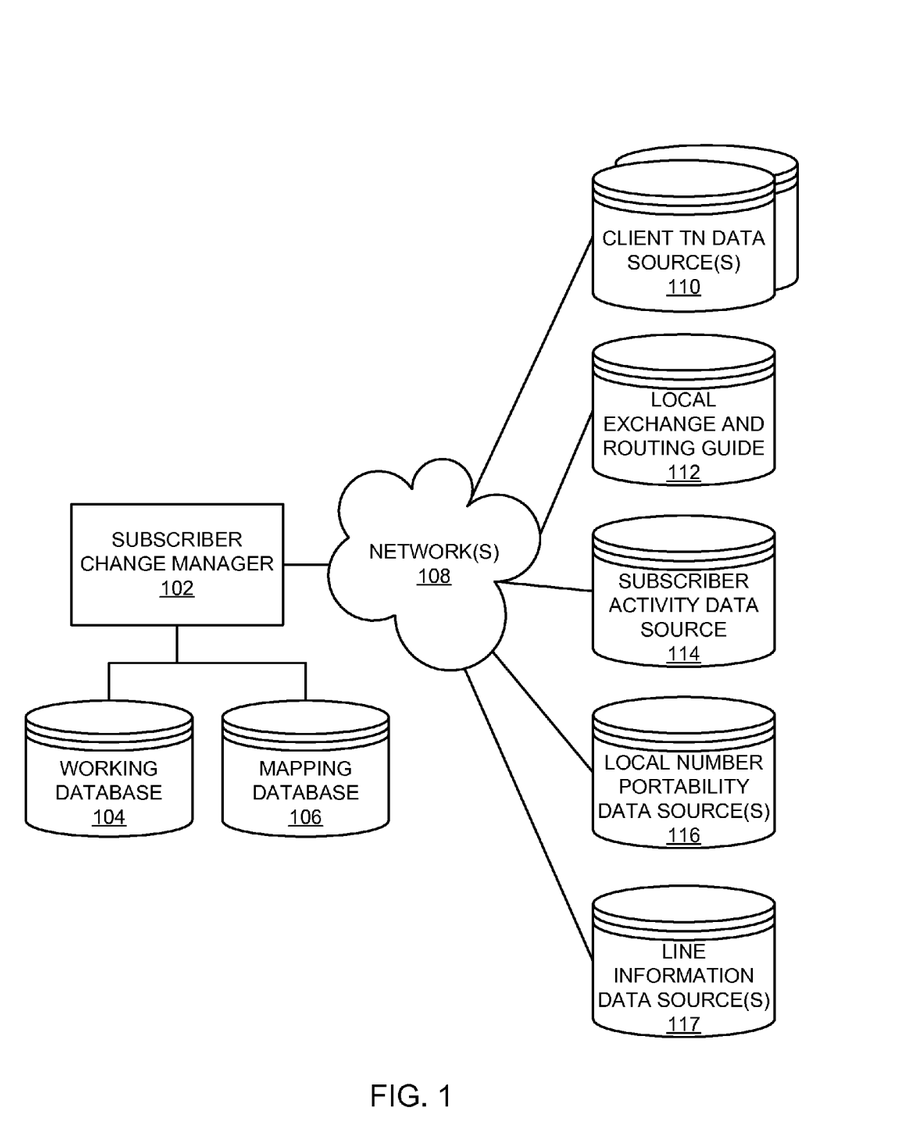
FIG. 1 is a block diagram of an example system to monitor subscriber activity.

FIG. 1 is an illustration of an example system 100 to monitor subscriber activity. In the illustrated example of FIG. 1, the system 100 includes a subscriber change manager 102 communicatively connected to a working database 104 and a mapping database 106. The example subscriber change manager 102 is also communicatively connected to one or more networks 108, which may be implemented as using an intranet and/or the Internet. Without limitation, the example working database 104 and/or the example mapping database 106 may be communicatively connected to the example subscriber change manager 102 via the example network 108.

The example subscriber manager 102 obtains client data from one or more client telephone number data sources 110 via the example network 108. Additionally, the example subscriber manager 102 is communicatively connected to a local exchange and routing guide (LERG) data source 112, which may, for example, be managed and operated by Telcordia®, a subscriber activity data source 114, one or more local number portability (LNP) data sources 116, and one or more line information databases (LiDB) 117. The example client telephone number data sources 110 provide and/or otherwise make available telephone subscriber records for a given time period (e.g., subscriber records for the current week). Additionally or alternatively, the data made available by the client telephone number data sources 110 may include only the new subscriber telephone numbers or only the telephone numbers associated with subscribers that have ceased their relationship with the client.

The example LERG data source 112 is published each month and provides information related to the public switched telephone network (PSTN). Information published by the LERG data source 112 includes, but is not limited to, operating carrier names (OCNs), operating carrier numbers, numbering plan area (NPA) assignments (area codes), local routing numbers (LRNs) and/or destination codes that include an exchange (NXX). As used herein, an OCN refers to a telecommunications provider that owns and/or otherwise operates some degree of telecommunications infrastructure. On the other hand, a service provider, also referred to as a carrier, is not necessarily an organization that owns and/or operates any telecommunications infrastructure, but is allowed to lease such infrastructure to facilitate its business of providing telephone services. Such service providers are also referred to as resellers. In the event that a service provider has some of its own infrastructure, but also leases its remaining infrastructure from one or more other companies, then such a service provider is typically referred to as an overbuilder.

The LERG data source 112 typically includes detail down to the ten-thousands block NPA-NXX. The LERG data source 112 may also include granularity down to the thousands block NPA-NXX-X for certain market areas. Generally speaking, access to the LERG data source 112 may reveal some information related to the owner (e.g., the carrier, or the telecommunications service provider) of any given telephone number. However, the LERG data source 112 does not typically differentiate between the telecommunications infrastructure provider and one or more overbuilders and/or resellers that market telecommunication services under one or more alternate names. Examples of such scenarios include, but are not limited to companies such as Sprint® or MCI® that provide an infrastructure, but the services are marketed under overbuilders and/or resellers, such as Time Warner® or WOW®.

The example subscriber activity data source 114 includes information related to activity for each telephone number. Activity data in the subscriber activity data source (SADS) 114 is updated on a more frequent basis (typically once per week) than the example LERG data source (typically once per month). Additionally, the SADS 114 includes more detailed granularity to the full ten-digit phone number rather than at the ten-thousands block (NPA-NXX) or thousands block (NPA-NXX-X) provided by the LERG data source 112. In some instances, if the client does not provide one or more lists of their current subscribers, dropped subscribers, or any combination thereof, the example SADS 114 may be used by the methods and apparatus described herein instead of such client subscriber data from the client. As such, while the example methods and apparatus described herein illustrate one or more examples in which both client-provided data and SADS 114 data are used, such examples are limited thereto.

Information provided by the example SADS 114 also includes add-events, change-events, and/or delete-events for each telephone number. For example, consumers and/or businesses that obtain a new address and phone number are typically identified by the SADS 114 as an add-event, which may indicate that the consumer and/or business has recently initiated new telecommunication services associated with the telephone number. On the other hand, the example SADS 114 identifies telephone numbers that have not changed, but some changes to an address and/or name have changed. Such change events may be caused by house number corrections, street number corrections, a change from a published listing to a non-published listing, a new secondary line (e.g., a new roommate), a subscriber name change due to marriage or divorce, and/or a business name change.

Other event information provided by the example SADS 114 includes telephone numbers that have been de-listed, telephone numbers that have been dropped, and/or telephone numbers that have been ported to a wireless service provider. Such change events are identified by the example SADS 114 as delete-events. For example, telephone numbers that have been dropped may indicate that the subscriber has terminated service with a first service provider and initiated service with a second service provider.

The example LNP data source 116 includes information related to telephone numbers that have been ported from one service provider to another service provider. Beginning in 2003, the Federal Communications Commission (FCC) requires that local exchange carriers (LECs) must provide local number portability for consumers when technically feasible. The FCC defined local number portability as the ability of users of telecommunications services to retain, at the same location, existing telecommunications numbers without impairment of quality, reliability, or convenience when switching from one telecommunications carrier to another. In most instances, a query to the LNP data source 116 by the subscriber change manger 102 reveals the OCN associated with the telephone number of interest after that number has been ported. In other instances, a query to the example LNP data source 116 also reveals one or more LRNs associated with one or more TN numbers of interest.

Generally speaking, access to one or more of the LERG data source 112, the subscriber activity data source 114, the LNP data source 116, and/or the LiDB 117 requires a membership, access credentials, and/or is associated with a per-access fee. In one example, a first tier query to the LNP data source 116 to determine the OCN of a telephone number requires a per-query fee. In the event that the first tier query to the example LNP data source 116 fails to identify the OCN associated with the telephone number of interest, a user of the example subscriber change manager 102 may invoke a second tier query to the LiDB 117 for an additional fee that may utilize one or more alternate data sources capable of providing some indication of the OCN. The second tier query is sometimes referred to as an account owner query (AOQ), which may access one or more LiDBs, such as the LiDB 117, each of which is typically maintained by a local telephone company.

As described above, even if one or more of the LERG data source 112, the subscriber activity data source 114, the LNP data source 116, and/or the LiDB 117 provide an OCN associated with the telephone number (TN) of interest, such data sources (112, 114, 116, 117) may not reveal the instances in which an overbuilder and/or reseller exists. As briefly described above, an overbuilder and/or a reseller may be a type of service provider, such as a cable company, that does not own all or some of the telecommunications infrastructure for its customers, and is more likely to exist in markets having relatively higher population densities, income, and/or household growth patterns. As such, in the event that the LERG data source 112, for example, identifies a telephone block associated with the OCN MCI®, the actual service provider may be an independent organization, such as a cable provider.

The example subscriber change manager 102 operates in the example system 100 to, in part, identify whether a new subscriber is a new-inroad, a competitive gain, a steady-state, or a competitive winback. Generally speaking, a new inroad is a subscriber of the client that is associated with a TN that was not previously in service for a particular period of time. Many service providers do not immediately reuse a TN after a subscriber has ceased their business relationship. Thus, new activity associated with the previously unused TN is typically deemed to be new activity for the next subscriber (i.e., a new inroad). On the other hand, in the event that the TN was recently associated with a first service provider and is currently associated with a second service provider, the associated TN is typically deemed to be a competitive gain for the second service provider. Still further, in some situations the period of time from the TN being associated with the first service provider, to the second service provider, and again back to the first service provider indicates that the first service provider has won-back that customer. As such, this circumstance is typically deemed to be a competitive winback for the first service provider.

Additionally, the example subscriber change manager 102 identifies subscriber losses and determines which competitors now control the telephone number associated with the customer that changed service providers. Further, the example subscriber change manager 102 determines service providers associated with TNs and/or TN blocks (e.g., NPA-NXX, NPA-NXX-X, etc.) in a manner that minimizes costs associated with accessing the LNP data source(s) 116 and/or one or more LiDBs 117 (e.g., minimizing a need to perform first and/or second tier queries).

In operation, the example subscriber change manager 102 of FIG. 1 obtains client TN data from the example client TN data source 110. As described above, in the event that the client does not have TN data to provide to the example subscriber change manager 102, the methods and apparatus described herein may employ TN number from the example SADS 114, without limitation. One example manner in which the subscriber change manager 102 obtains the client TN data occurs by a query from the subscriber change manager 102 to the client TN data source 110 via the network 108. The example subscriber change manager 102 may provide the client TN data source 110 with one or more authentication credentials to verify access permission. Additionally or alternatively, the example subscriber change manager 102 may facilitate a file transfer protocol (FTP) directory that is monitored for one or more instances in which a client may place TN data from their client TN data source 110. Such TN data may include, but is not limited to, a list of all of the client subscribers for a given time period (e.g., a given number of days, a given week, etc.), a list of all new subscribers, a list of all disconnected subscribers, and/or a list of subscribers associated with a particular market, zip code, and/or core based statistical area (CBSA).

To determine whether one or more TNs are associated with a new inroad, a competitive gain, a competitive winback, and/or a steady-state condition in which the TN has no corresponding subscriber change activity, the example subscriber change manager 102 compares the obtained client TN data with one or more sets of client TN data associated with one or more earlier time periods. In the illustrated example of FIG. 1, the one or more earlier sets of client TN data are stored in the working database 104 and/or may be obtained by the subscriber change manager 102 from the client TN data source 110 and/or the SADS 114 upon request. For a given TN of interest, if the current client TN data and one or more of the prior client TN data sets illustrate that the TN of interest is still associated with the client, then the subscriber change manager 102 confirms a steady-state condition for that TN of interest.

On the other hand, if the current client TN data and one or more of the prior client TN data sets illustrate that the TN of interest was previously associated with a competitor of the client, then the example subscriber change manager 102 determines whether a competitive gain condition or a competitive winback condition exists. As described in further detail below, to distinguish between a competitive gain versus a winback condition, the example subscriber change manager 102 obtains block ownership information (e.g., NPA-NXX, NPA-NXX-X, etc.) from the LERG data source 112, activity information from a current and/or past sets of data from the example SADS 114, and any occurrence(s) of LNP activity from the example LNP data source 116.

In view of the possibility that one or more of the LERG data source 112, the SADS 114, the LNP data source 116, and/or the LiDB 117 includes outdated, imprecise, and/or missing information, the example subscriber change manager 102 employs the example mapping database 106 to replace and/or supplement information to be associated with the TN of interest. For example, the subscriber change manager 102 may make an initial assessment of the TN of interest by one or more queries to the LERG data source 112 to determine a block owner. While a one-thousands block (i.e., NPA-NXX-X) may reveal a given service provider, the LERG data source 112 information may be up to one-month old. Additionally, the LERG data source 112 information will not contain more granular information related to the specific TN of interest. That is, if the example number of interest is 262-542-6609, then the most granular information available in the LERG data source 112 will include 999 other telephone numbers associated with the block 262-542-6XXX (where XXX includes numbers 000 through 999). However, if the customer associated with 262-542-6609 ported that number to an alternate service provider, the example LERG data source 112 may not reflect the true service provider currently associated with that number.

The example subscriber change manager 102 also queries the example SADS 114 to determine, in part, current add-events, change-events, and/or delete-events associated with the full TN of interest (e.g., all ten-digits of the example number 262-542-6609). Such events, if any, may be compared with events that have occurred during prior time periods, such as prior days, weeks, and/or months. As described in further detail below, events from the example SADS 114 and changes in the client TN data set(s) may be compared in a manner to identify whether the TN of interest has been involved in a steady state condition, a new inroad, a competitive gain, and/or a winback for the client.

To determine which telephone company owns the TN of interest, the example subscriber change manager 102 obtains OCN information from the example LNP data source 116. If the OCN information is unavailable, such as after a first tier request by the example subscriber change manager 102 to the LNP data source 116, a more expensive second tier request may be performed to one or more LiDBs 117 in an effort to ascertain information related to the wholesale relationships between an OCN and one or more service providers, such as the service provider associated with the TN of interest. Additionally or alternatively, the example subscriber change manager 102 may employ the example mapping database 106 to resolve which service provider(s) are associated with the TN of interest, as described in further detail below.

Figure 2:
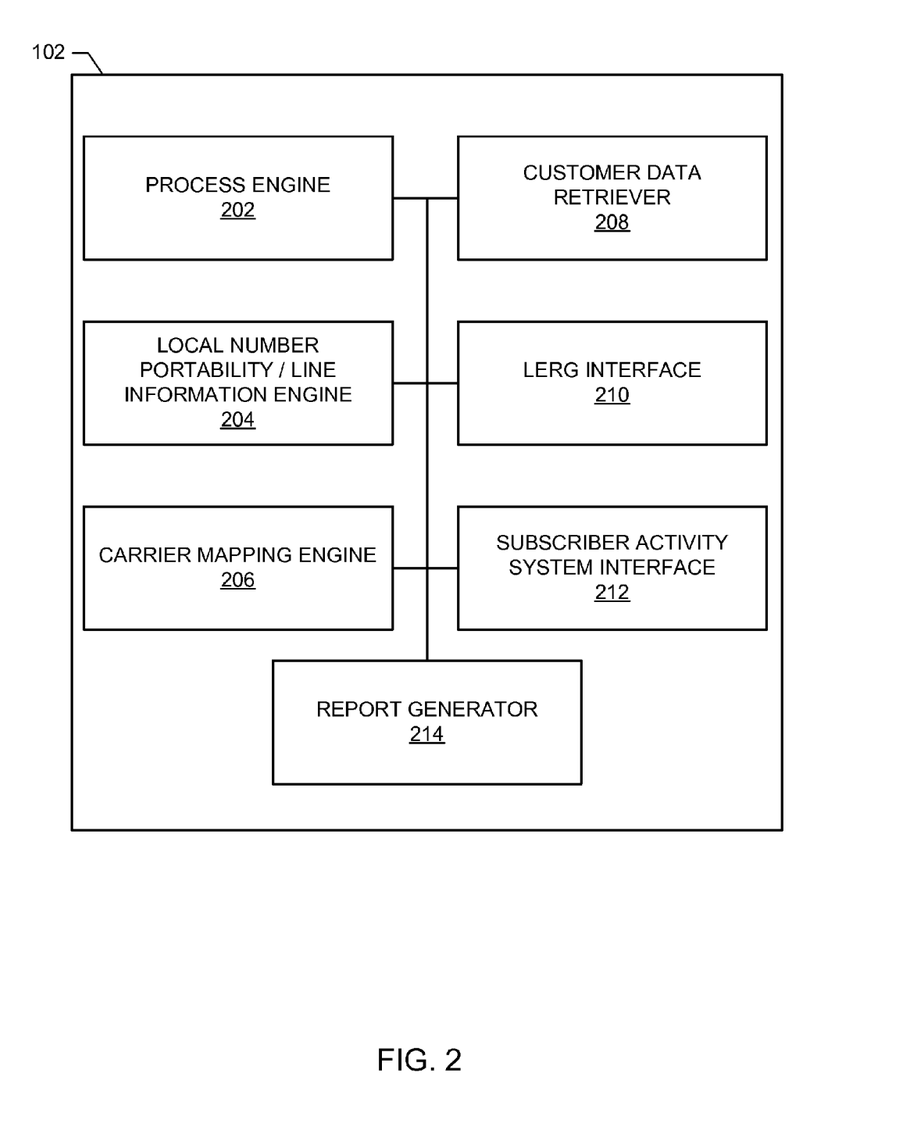
FIG. 2 is a block diagram of an example subscriber change manager shown in FIG. 1.

FIG. 2 is a detailed schematic illustration of the example subscriber change manager 102 shown in FIG. 1. The example subscriber change manager 102 includes a process engine 202, a local number portability (LNP) and line information engine 204, a carrier mapping engine 206, a customer data retriever 208, a LERG interface 210, a subscriber activity system interface 212, and a report generator 214. In operation, the example process engine 202 invokes the customer data retriever 208 to obtain client TN data from the example client TN data source 110. Authentication credentials may be provided by the example customer data retriever 208 to gain access to the client TN data source 110 before retrieving and/or otherwise receiving one or more data sets from the client. Additionally or alternatively, the example process engine 202 may invoke the customer data retriever 208 to facilitate one or more FTP directories that allow one or more clients to upload TN data to the example subscriber change manager 102. When one or more files indicative of client TN data is uploaded by a client, the example process engine of FIG. 2 may begin to analyze the received data.

Data sets indicative of client TN data may include, but are not limited to, a date for the data, a region (e.g., Midwest, West, Southwest, etc.), an NPA (e.g., a 3-digit area code), an NXX (e.g., a 3-digit prefix), a TN suffix (e.g., the last 4-digits of the TN), whether the line type is primary (i.e., the only line associated with the address) or secondary (i.e., one or more additional lines associated with the address), whether the customer is residential or business, and/or a zip code.

The example process engine 202 may also invoke the example subscriber activity system interface 212 to initiate one or more queries to the example SADS 114. At least one example provider of telephony-sourced national databases of telephone listings is LSSiData® that, in part, compiles information related to telephone number activity on a daily basis. Information obtained from the subscriber activity system interface 212 includes, but is not limited to, a telephone number, a corresponding last and/or first name, a corresponding current address (e.g., house number, street, city, state, zip), a corresponding prior address, the type of housing (e.g., residence, business, etc.), do-not-call status, and/or an event code associated with the TN. Event codes may include, but are not limited to general add-events, change-events, and delete-events. An example add-event may include a new subscriber associated with the TN or an existing subscriber that has moved from one residence/business to another. An example change-event may include a subscriber with a corrected house or street number in a directory listing, a name change, and/or a change from a listed TN to an unlisted TN. An example delete-event may include a dropped line that may or may not be followed by porting activity and/or removal of secondary line(s).

In the illustrated example of FIG. 2, the process engine 202 also invokes the example LNP/line information engine 204 and the example LERG interface 210 to determine, in part, OCN information associated with the TN of interest. Additionally or alternatively, the LNP/line information engine 204 may determine an LRN associated with the TN of interest. The example LNP/line information engine 204 may provide authentication credentials to the LNP data source 116 and/or the LiDB 117 in circumstances where a first and second tier query is requested, respectively. Further, the example LERG interface 210 may provide authentication credentials to the LERG data source 112 of FIG. 1. As explained in further detail below, even if the LNP/line information engine 204 and the LERG interface 210 are able to derive some information indicative of the OCN associated with the TN of interest, such information may not be accurate in view of overbuilder/reseller activity in that particular market. As such, the example carrier mapping engine 206 may, in part, compare a zip code associated with the TN of interest and further associate known overbuilder/reseller and/or mapping that apply in that particular market. Additionally or alternatively, the example carrier mapping engine 206 may utilize the block owner obtained from the example LERG interface 210 to determine which overbuilders/resellers consume infrastructure from that block owner, thereby allowing a specific overbuilder/reseller to be identified.

After determining the carrier/service provider(s) associated with each TN of interest, identifying an add-event, a change-event, and/or a delete-event, the example subscriber change manager 102 prepares a report for the client with the example report generator 214. The example report generator 214 may generate one or more reports that identify a date range and a corresponding percentage share of new inroads for a given market area. Without limitation, the example report generator 214 may generate one or more reports to identify a percentage of TN changes associated with new inroads, competitive gains, winbacks, and/or which competitive service providers took market share for a given date-range.

While an example system 100 to monitor subscriber activity and an example subscriber change manager 102 has been illustrated in FIGS. 1 and 2, one or more of the interfaces, data structures, elements, processes and/or devices illustrated in FIGS. 1 and 2 may be combined, divided, re-arranged, omitted, eliminated and/or implemented in any other way. Further, the example subscriber change manager 102, the example working database 104, the example mapping database 106, the example process engine 202, the example LNP/line information engine 204, the example carrier mapping engine 206, the example customer data retriever 208, the example LERG interface 210, the example subscriber activity system interface 212, and/or the example report generator 214 of FIGS. 1 and 2 may be implemented by hardware, software, firmware and/or any combination of hardware, software and/or firmware. Thus, for example, any or the example subscriber change manager 102, the example working database 104, the example mapping database 106, the example process engine 202, the example LNP/line information engine 204, the example carrier mapping engine 206, the example customer data retriever 208, the example LERG interface 210, the example subscriber activity system interface 212, and/or the example report generator 214 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example subscriber change manager 102, the example working database 104, the example mapping database 106, the example process engine 202, the example LNP/line information engine 204, the example carrier mapping engine 206, the example customer data retriever 208, the example LERG interface 210, the example subscriber activity system interface 212, and/or the example report generator 214 are hereby expressly defined to include a tangible medium such as a memory, a digital versatile disc (DVD), a compact disc (CD), etc. storing the firmware and/or software. Further still, a communication system may include interfaces, data structures, elements, processes and/or devices instead of, or in addition to, those illustrated in FIGS. 1 and 2 and/or may include more than one of any or all of the illustrated interfaces, data structures, elements, processes and/or devices.

FIGS. 3, 4, 5A, 5B, 6A, 6B, and 7 illustrate example processes that may be performed to implement the example subscriber change manager 102 of FIGS. 1 and 2. The example processes of FIGS. 3, 4, 5A, 5B, 6A, 6B, and 7 may be carried out by a processor, a controller and/or any other suitable processing device. For example, the example processes of FIGS. 3, 4, 5A, 5B, 6A, 6B, and 7 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-readable instructions or data structures, and which can be accessed by a processor, a general-purpose or special-purpose computer, or other machine with a processor (e.g., the example processor platform P100 discussed below in connection with FIG. 8). Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example processes of FIGS. 3, 4, 5A, 5B, 6A, 6B, and 7 may be implemented using any combination(s) of ASIC(s), PLD(s), FPLD(s), discrete logic, hardware, firmware, etc. Also, some or all of the example processes of FIGS. 3, 4, 5A, 5B, 6A, 6B, and 7 may instead be implemented manually or as any combination of any of the foregoing techniques, for example, any combination of firmware, software, discrete logic and/or hardware. Further, many other methods of implementing the example operations of FIGS. 3, 4, 5A, 5B, 6A, 6B, and 7 may be employed. For example, the order of execution of the blocks may be changed, and/or one or more of the blocks described may be changed, eliminated, sub-divided, or combined. Additionally, any or all of the example processes of FIGS. 3, 4, 5A, 5B, 6A, 6B, and 7 may be carried out sequentially and/or carried out in parallel by, for example, separate processing threads, processors, devices, discrete logic, circuits, etc.

Figure 3:
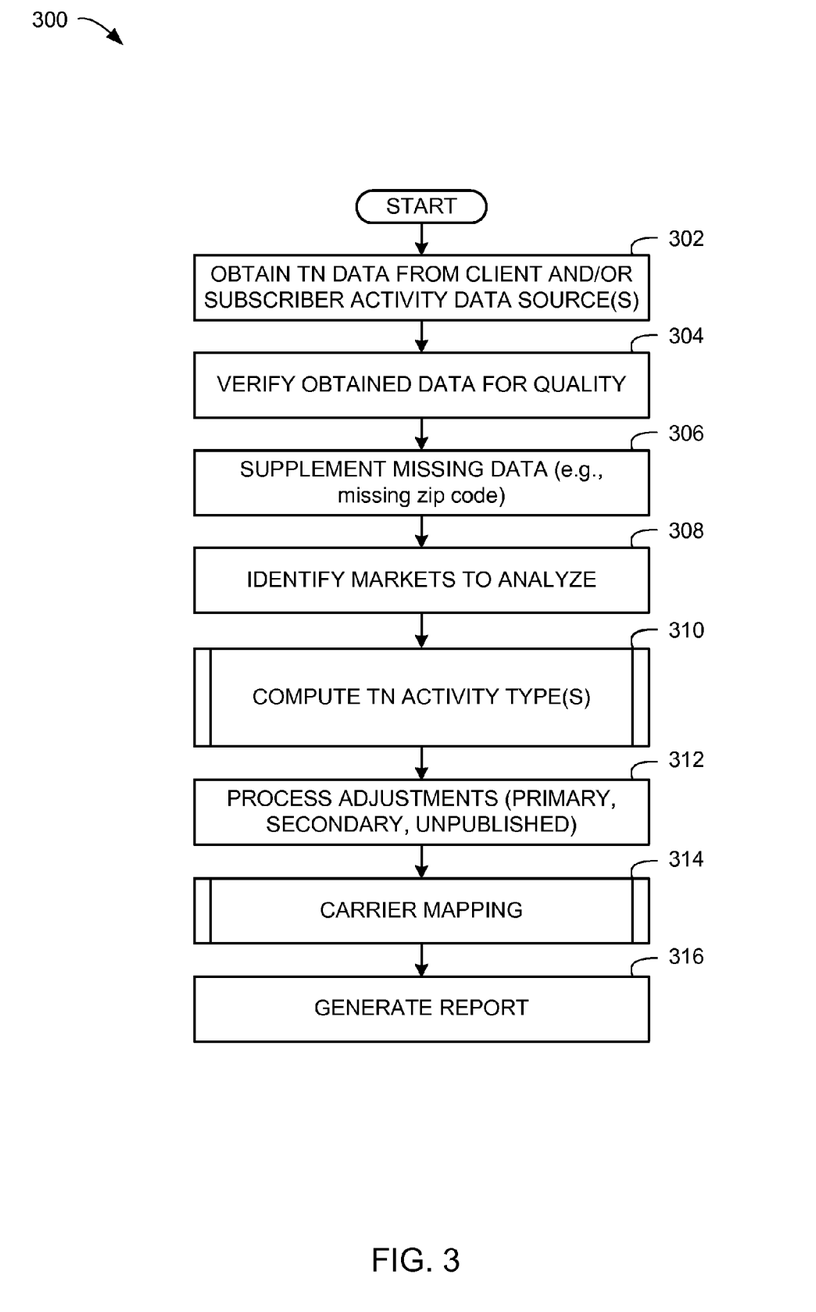
FIGS. 3, 4, 5A, 5B, 6A, 6B, and 7 are flowcharts representative of example processes that may be performed to implement one or more entities of the example systems and apparatus of FIGS. 1 and 2.

The example process of FIG. 3 begins with the example process engine 202 invoking the customer data retriever 208 to obtain client TN data from the example client TN data source 110 and the example subscriber activity system interface 212 obtaining TN activity data from the example subscriber activity data source 114 (block 302). The data obtained from the client data source 110 includes one or more files indicative of businesses and/or residential locations having working TNs at a specified point in time. More specifically, the working TNs are those that have service with clients at that point in time. To determine that retrieved and/or otherwise received data is valid, the example customer data retriever 208 verifies the obtained data for quality (block 304). For example, a user of the example subscriber change manager 102 may require that the number of TNs in the obtained client TN data be within +/−y percent (e.g., +/−0.3%) of a previous week count of TNs. TN count values that are beyond such a threshold amount may indicate erroneous data based on known and/or predicted values known to a client. Another example quality verification (block 304) may include an analysis of the obtained data to determine whether each TN is associated with a corresponding zip code value. The user of the example subscriber change manager 102 may require that no fewer than x percent (e.g., 83%) of the obtained records include a corresponding zip code.

Without limitation, quality verification may occur when retrieving data from the example subscriber activity system interface 212. For example, if the previous two time-periods (e.g., previous two-weeks) of activity data included 1400 add-events for a given market area, then the example subscriber activity system interface 212 may be configured to verify that the latest received activity data is within ten-percent of that value. Spikes above such a threshold percentage (e.g., 10%) may be flagged as erroneous data to allow, for example, one or more subsequent attempts at acquiring data for further analysis.

In the event that one or more TNs received from the client do not contain certain data such as an associated zip code, the example customer data retriever 208 may query the example mapping database 106 to identify a best fit zip code (block 306). The example mapping database 106 includes, in part, a list of blocks, such as NPA-NXX, NPA-NXX-X, and/or NPAs associated with corresponding zip codes. In situations where there are two or more matches of a zip code to a given TN, then the example customer data retriever 208 may select the matching zip code having, for example, the lowest value and flag the TN for further review and/or eliminate the TN from consideration.

If the client prefers that only one or more specific market areas be analyzed, such as only TNs within a specific zip code, only TNs having a specific area code, and/or TNs having a specific region (e.g., Midwest), then the example process engine 202 may parse the obtained client TN data having the identified parameters (block 308). As described above, in the event that the client does not have and/or otherwise provide their own client data, the example process engine 202 may parse data obtained from the example SADS 114. Specific market areas may also conform to a core based statistical area (CBSA), which typically conforms to standards applied by governmental census activity. Further, the data parsed by the example process engine 202 is not limited to TNs associated with the client, thus, the methods and apparatus described herein may also analyze competitor TNs to identify at least one of new inroads, competitive gains, and/or winbacks.

After obtaining the TN data from the client (block 302), verifying the obtained data for quality (block 304), supplementing missing data (block 306), if any, and identifying one or more markets to analyze (block 308), the example subscriber change manager 102 computes a TN activity type (block 310). Generally speaking, the example subscriber change manager 102 compares current and prior client TN data, compares current and prior subscriber activity data, and determines ownership status information for each TN to determine whether each TN is a new inroad, a competitive gain, a steady-state, a disconnect, or a competitive winback (block 310).

In the illustrated example of FIG. 3, one or more statistical forecasting techniques are employed to adjust results to account for removal of TNs associated with secondary telephone lines and/or unpublished TNs (block 312) that may otherwise skew the results. For some markets, carrier overrides are performed to, in part, replace one or more results with nomenclature that the client either understands and/or prefers to view. Additionally, carrier mapping is performed (block 314) to, in part, resolve service providers based on OCN input(s). The resulting activity data and/or mapping data may then be used to generate one or more reports (block 316).

Figure 4:
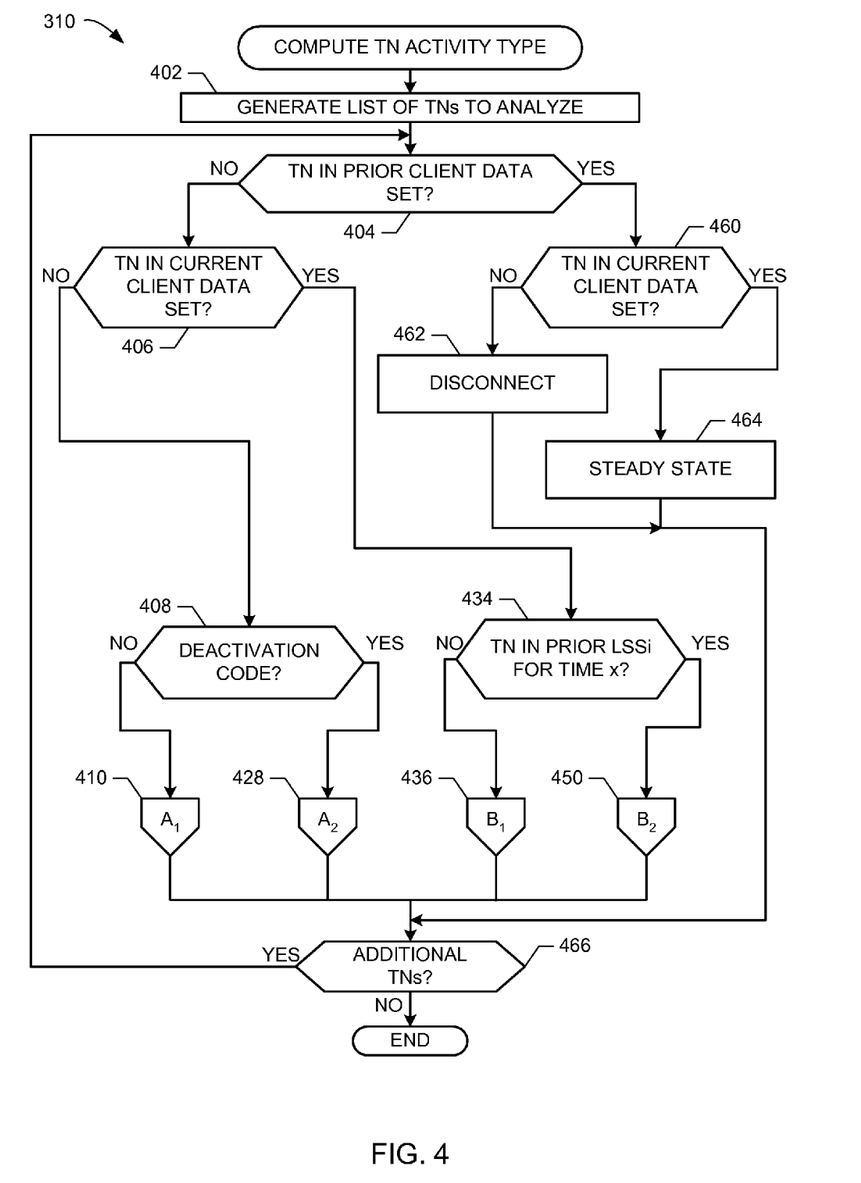

Returning to block 310, example processes are shown in FIG. 4 to compute TN activity type(s). The example process 310 of FIG. 4 begins with the example process engine 202 generating a list of TNs to analyze (block 402). For example, the TNs obtained from the client current week file may include current client subscribers and their associated TNs. Additionally, the TNs obtained from the subscriber activity data source 114 for the current time-period (e.g., the current week) include TNs that may or may not also be present within the client's TN data. As such, the example process engine 202 may generate a list of differences between the client TNs and the TNs of a current time-period of the subscriber activity data source 114, some of which may represent activity associated with disconnected TNs, new subscribers, competitive gains, and/or winbacks.

Further, the example process engine 202 determines whether a client TN from the obtained client TNs was present in a prior client TN file (block 404). If not, the process engine 202 determines whether the TN of interest is in the client file for the current time-period (block 406). If the TN is not in the current client file (block 406), and there is no corresponding disconnect code, such as a delete-event and/or deactivation code identified by the subscriber activity data source 114 (block 408), then control proceeds to block 410, which is shown in further detail in FIG. 5A. In other words, instead of a delete-event, control proceeds to block 410 in the event that, for example, an add-event or a change-event exists (block 408).

Figure 5A:
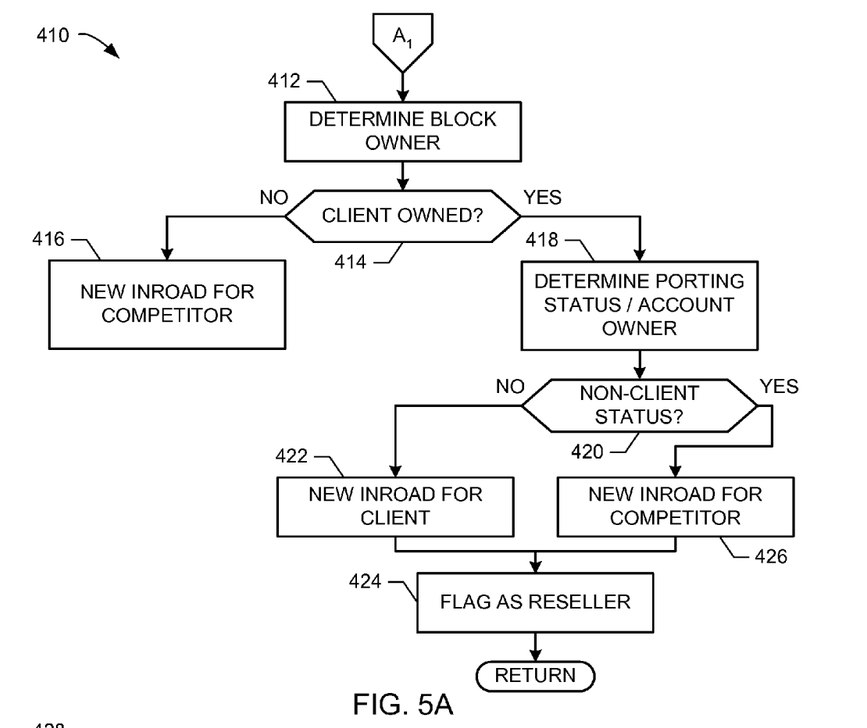
Figure 5B:
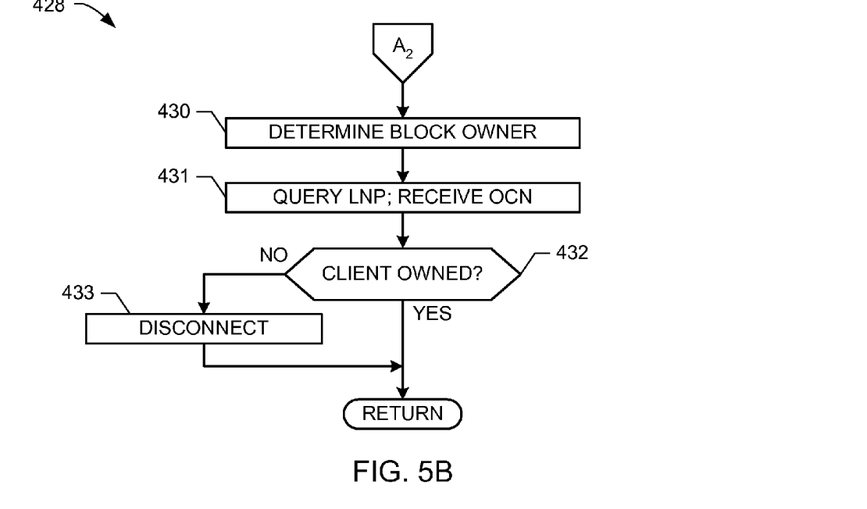

In the illustrated example of FIG. 5A, the example LERG interface 210 determines the block ownership of the TN of interest (block 412), and if the TN block (e.g., NPA-NXX, NPA-NXX-X, etc.) is not owned by the client (block 414), then the TN of interest is identified as a new inroad for the client's competitor (block 416). The new inroad for the client's competitor (block 416) may also be referred to as a competitive loss. On the other hand, if the TN block is owned by the client (block 414), then the example LNP/line information engine 204 queries the LNP data source 116 to determine a porting status of the TN of interest (block 418). In the event that the LNP query identifies the TN as not associated with a port to a competitor (block 420), then the TN of interest is identified as a new inroad for the client (block 422), and the TN of interest is also identified as a potential reseller (block 424). However, if the LNP query identifies the TN as associated with a port to a competitor (block 420), then the TN of interest is identified as a new inroad for the competitor (block 426).

Briefly returning to FIG. 4, in the event that a disconnect code is associated with the TN of interest (block 408), then control proceeds to block 428 (shown in further detail in FIG. 5B) in which the example LERG interface 210 determines the block ownership of the TN of interest (block 430). Additionally, an LNP query is initiated by the example LNP/line information engine 204 to obtain OCN information related to the TN of interest (block 431). If the OCN does not indicate that the TN of interest is owned by the client (block 432), then the TN of interest is identified as a client disconnect condition (block 433).

Again returning to FIG. 4, in the event that the example process engine 202 determines that the TN of interest is absent from the prior client file and present in the current client TN file (block 406), then the subscriber activity system interface 212 determines whether that TN was also found within a threshold number of prior time periods in the subscriber activity data source 114 (block 434). For example, some clients typically associate a competitive winback condition as that which the client has a subscriber's business, loses that business to a competitor, and then re-gains and/or wins-back the subscriber's business within a five to six week time period. However, if the TN of interest is not in one or more time periods (e.g., x=5 weeks), then control proceeds to block 436, which is shown in further detail in FIG. 6A.

Figure 6A:
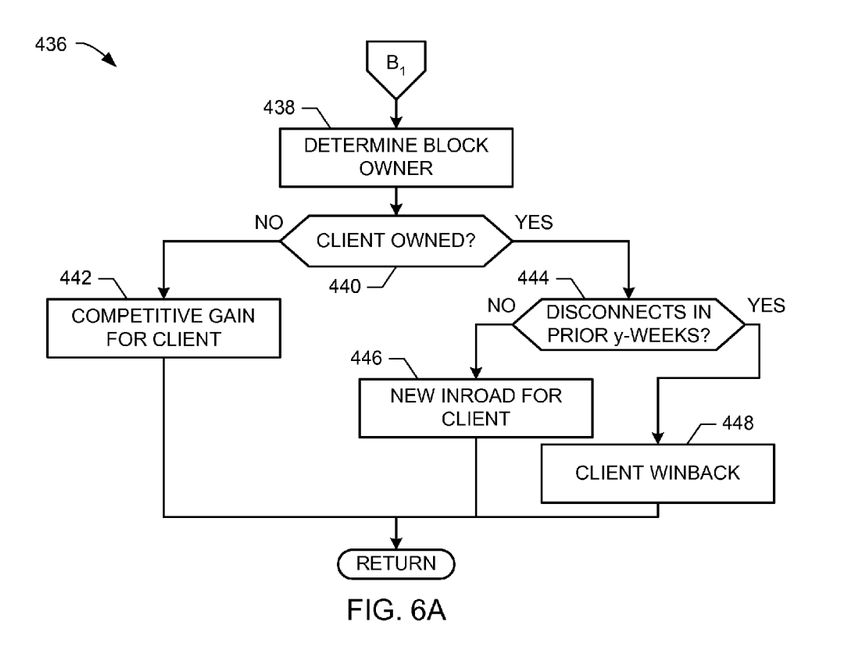

In the illustrated example of FIG. 6A, the example LERG interface 210 determines the block owner for the TN of interest (block 438), and if it is not owned by the client (block 440), the TN of interest is identified as a competitive gain for the client (block 442). For example, the aforementioned competitive gain for the client is a valid determination when the TN of interest is not in the prior client file (block 404), but is in the current client TN file (block 406) even though the LERG data source identifies competitive ownership because the LERG data source 112 is typically updated on a monthly basis. In other words, because the LERG data source 112 is the oldest data, other indicators of ownership may be deemed to have more reliability in some circumstances.

However, if the LERG data source 112 indicates that the TN of interest (or at least the block associated with the TN of interest) is owned by the client, the example subscriber activity system interface 212 performs an additional check of a threshold number of prior time period(s) data (e.g., previous 5-weeks) to identify a disconnect code (block 444). If no such code is found, then the TN of interest is identified as a new inroad for the client (block 446), otherwise the TN of interest is identified as a client winback (block 448).

Figure 6B:
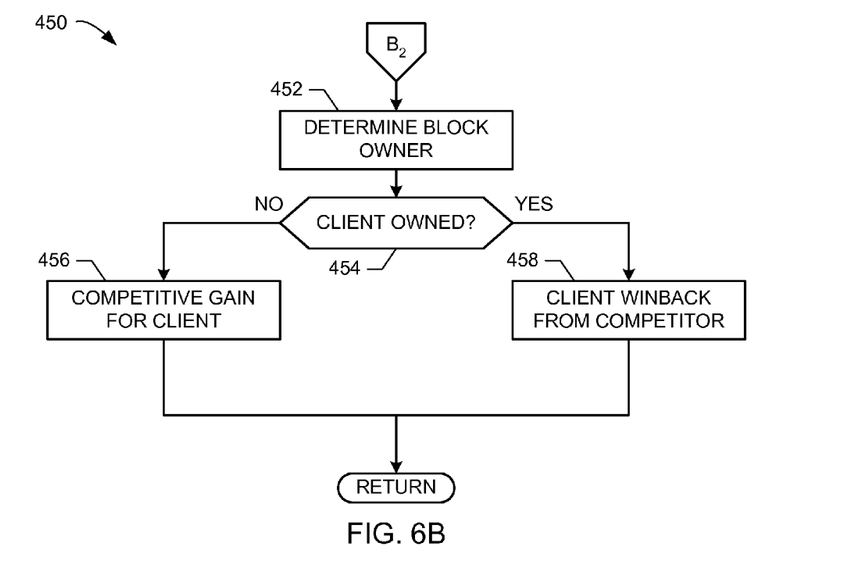

Briefly returning to FIG. 4, in the event that the TN of interest was found within a threshold number of prior time periods in the subscriber activity data source 114 (block 434), control advances to block 450, which is shown in further detail in FIG. 6B. In the illustrated example of FIG. 6B, the example LERG interface 210 determines the block ownership of the TN of interest (block 452), and if not owned by the client (block 454), the TN of interest is identified as a competitive gain for the client (block 456). Otherwise, if the TN of interest is not identified as owned by the client (block 454), then the TN of interest is identified as a winback from the competitor (block 458).

Returning again to FIG. 4, if the TN of interest is in the prior client file (block 404), but not in the current client TN file (block 460), then the TN of interest is identified as a disconnect (block 462). For example, the generated list of TNs to analyze (block 402) may have identified one or more TNs of interest that may not be in the current client file by virtue of a comparison between past and/or current client TNs and past and/or current TNs in the example subscriber activity data source 114. On the other hand, if the TN of interest is in both the current client TN file and one or more prior client TN file(s), then the TN of interest is identified as a steady-state (block 464). If there are additional TNs of interest to be evaluated from the generated list of TNs (block 466), then control advances to block 404, otherwise control advances to block 314 as shown in FIG. 3.

Returning to FIG. 3, one or more adjustments are made to the analyzed TNs (block 312). For example, any of the TNs flagged as a potential reseller may be submitted to an LNP query to determine a porting status which reveals an OCN. In other words, the OCN identifies the major telecommunications network company providing infrastructure. However, the LNP query may not always be successful. As such, the TN may be provided as input for an AOQ by the example LNP/line information engine 204 so that a corresponding LiDB query of the line information data source 117 may occur. The AOQ is typically a more expensive query that may be applied to a certain percentage of analyzed TNs so that results can be projected to one or more larger market(s). One example vendor that may provide the AOQ is Accudata®, thus such projection(s) based on a partial subset of TNs allow the user of the example subscriber change manager 102 to save costs during the analysis (e.g., perform AOQ on only 10% of the TNs).

Additional projection(s) that may be performed during process adjustment (block 312) include scaling down the analyzed TNs based on a projected number of TNs associated with a secondary telephone line within a residential household. In some circumstances, the client TN data indicates whether the TN is associated with a primary or secondary line, and in other circumstances, the subscriber activity data source 114 provides information related to primary and/or secondary lines. Any TNs associated with a secondary line are typically removed from the analysis so that conclusions derived are focused on primary line activity.

Another example adjustment processed (block 312) by the example subscriber change manager 102 includes increasing or decreasing one or more analyzed conclusions based on industry expectations. One such industry expectation includes subscribers that have unpublished TNs. Despite the occurrence of new inroads, disconnects, competitive gains, and/or winbacks, a client typically exhibits a consistent rate of unpublished TNs. Such rate(s) are associated with a factor to allow adjustment of a conclusion of, for example, the number of new inwards for the client. For example, if the analysis shows that zip code 56001 (i.e., Mankato, Minn.) is associated with twenty instances of new inroads for the service provider Comcast®, and if an associated weighting factor for Comcast®, based on industry trending, is 0.7459, then the resulting number of new inroads associated with zip code 56001 becomes 26.8 (i.e., 20 divided by 0.7459).

Yet another adjustment processed (block 312) by the example subscriber change manager 102 includes identifying which TNs may be associated with voice over Internet protocol (VoIP) providers. For example, the process engine 202 of the subscriber change manager 102 may invoke a VoIP resolving system and methods as described in United States Publication No. (number to be determined), entitled "Methods and Systems for Measuring Market Share for Voice over Internet Protocol Carriers," filed on Oct. 1, 2008, which is hereby incorporated by reference in its entirety.

In the illustrated example of FIG. 3, the process engine 202 invokes the carrier mapping engine 206 to resolve a service provider with OCN data returned by the example LERG data source 112 the example LNP data source 116, and/or the example line information data source 117 (block 314). As described above, the first-tier and/or second-tier database queries performed by the example LNP/line information engine 204 may inflate the client's costs associated with determining which service provider is associated with one or more TNs. To minimize and/or eliminate the need to perform a second-tier database query, the example carrier mapping engine 206 accesses the example mapping database 106 to access data indicative of market commercial activity. Additionally or alternatively, even after a second-tier query, the OCN data returned may not necessarily be correct, thus, the example carrier mapping engine may override results before generating a client report. The example mapping database 106 includes, in part, names and associated markets, zip codes, and OCNs that competitors are known to operate.

Figure 7:
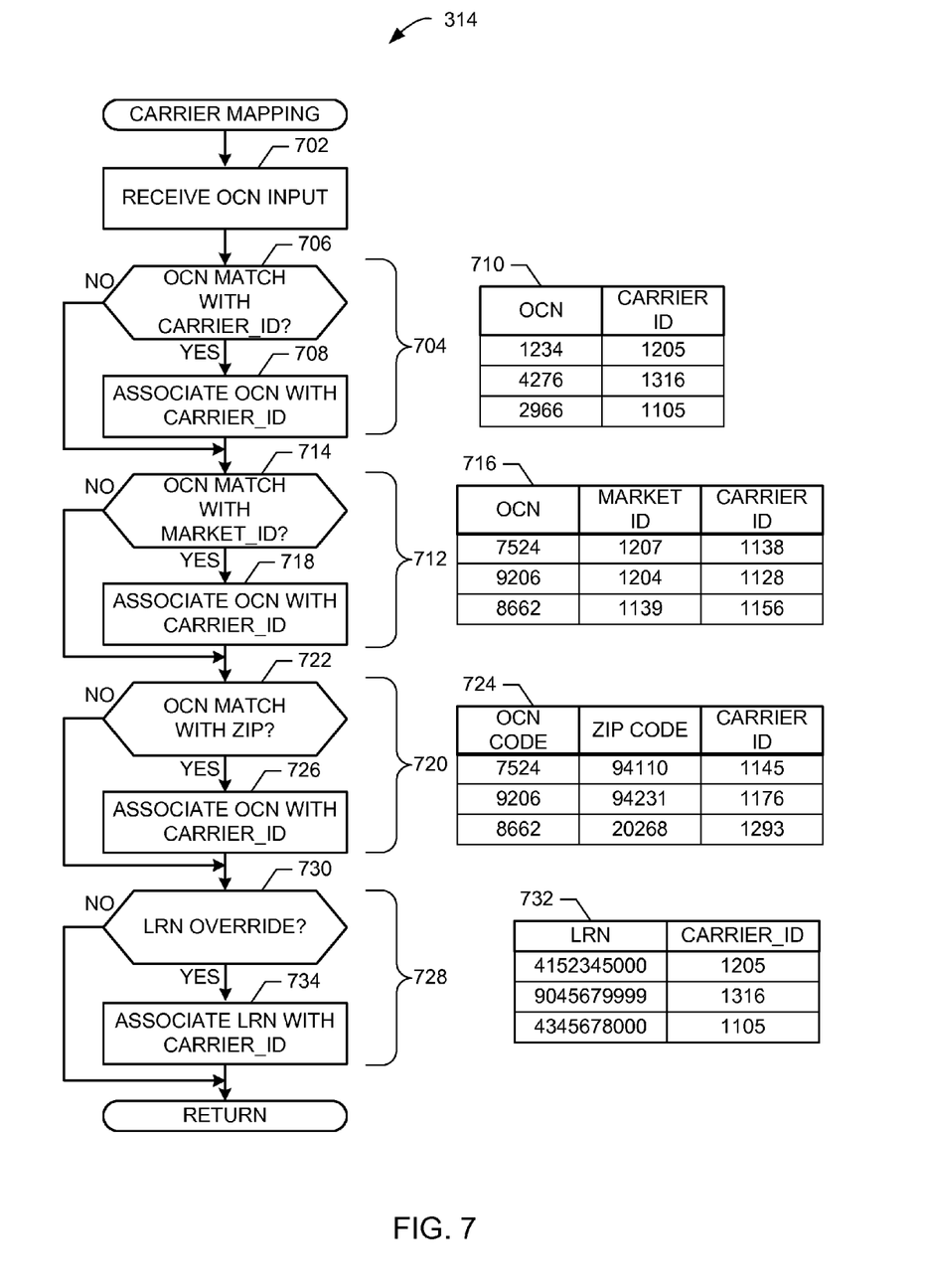

FIG. 7 illustrates an example process that may be executed to implement the example carrier mapping engine 206 of FIG. 2. The carrier mapping engine 206 uses OCN data as input (block 702). As described above, the OCN typically reveals the operating carrier name associated with the infrastructure provider, but does not typically include more specific information related to one or more overbuilders/resellers that independently market one or more blocks of TNs from the OCN. In some circumstances, the OCN and the service provider may be one in the same, while in other circumstances the service provider may be, for example, a cable company that also markets telephone services.

The example carrier mapping process of FIG. 7 may operate in a hierarchical manner, in which each subsequent sequence allows more granularity that the prior sequence. For example, a first sequence 704 identifies any matches between the provided OCN and a carrier identifier (block 706) and, if found, the carrier identifier is matched or associated with the TN of interest (block 708). An example OCN-Carrier Identifier table 710 is shown in FIG. 7, which may be stored in the mapping database 106. If the OCN associated with the TN of interest is, for example, "1234," then the example carrier mapping engine 206 associates that TN of interest with the carrier identifier "1205." While the example carrier identifiers of FIG. 7 are shown as four digit integers, any other indicia of the carrier identifier may be employed without limitation, such as one or more alpha-numeric strings (e.g., Verizon Wireless).

If the OCN does not have a corresponding matching carrier identifier, or if the user of the example carrier mapping engine 206 chooses to employ an alternate and/or additional mapping sequence, control proceeds to a second sequence 712. The example second sequence 712 identifies a match between the received OCN and a market identifier associated with the TN of interest (block 714). If a match is found, such as in an example OCN-Market table 716, then the TN of interest is associated with a corresponding carrier identifier from the OCN-Market table 716 (block 718).

If the OCN does not have a corresponding matching market identifier, or if the user of the example carrier mapping engine 206 chooses to employ an alternate and/or additional mapping sequence, control proceeds to a third sequence 720. The example third sequence 720 identifies a match between the received OCN and a zip code associated with the TN of interest (block 722). If a match is found, such as in an example OCN-Zip Code table 724, then the TN of interest is associated with a corresponding carrier identifier from the OCN-Zip Code table 724 (block 726).

If the OCN does not have a corresponding matching Zip code identifier, or if the user of the example carrier mapping engine 206 chooses to employ an alternate and/or additional mapping sequence, control proceeds to a fourth sequence 728. The example fourth sequence 728 utilizes the LRN associated with the TN of interest and/or the OCN and attempts to determine a match (block 730). The LRN is typically a ten-digit number that is associated with every ported TN. The LRN operates as a switching identifier for one or more telephone networks, thereby providing a greater degree of granular detail regarding the ultimate service provider (carrier identifier). If a match is found, such as in an example LRN table 732, then the TN of interest is associated with a corresponding carrier identifier from the LRN table 732 (block 734).

Returning to FIG. 3, the example subscriber change manager 102 invokes the report generator 214 to generate one or more output reports based on add-events, change-events, delete-events and/or the corresponding service provider(s) (carrier(s)) for each TN analyzed (block 316). Such reports may, for example, summarize a percentage of new inroads for each competitor by zip code, by market area, and/or by CBSA. Additionally, reports may be generated by the example report generator 214 based on trends for an identified duration, such as a 5-week period.

While the example carrier mapping of FIGS. 3 and 7 were described in view of example processes that also identify telecom change events, carrier mapping may be employed separately in the event a user only wishes to determine corresponding carriers associated with TNs. For example, a client may provide, or the example subscriber change manager 102 may otherwise obtain, a list of client TNs that are known to have been recently disconnected from service. As such, carrier mapping may be employed to identify which clients are responsible for those losses.

Figure 8:
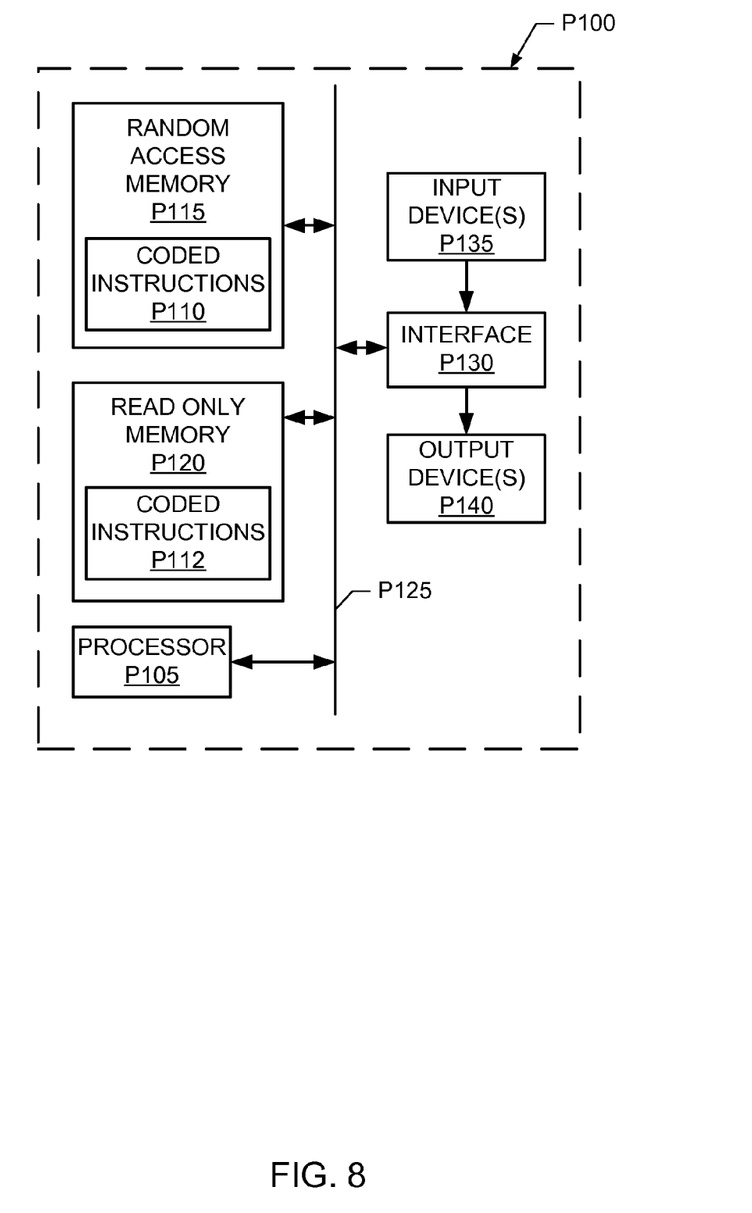
FIG. 8 is a block diagram of an example processor system that may be used to execute the example processes of FIGS. 3, 4, 5A, 5B, 6A, 6B, and 7 to implement the example systems, apparatus, and/or methods described herein.

FIG. 8 is a schematic diagram of an example processor platform P100 that may be used and/or programmed to implement any or all of the example subscriber change manager 102, the example working database 104, the example mapping database 106, the example process engine 202, the example LNP engine 204, the example carrier mapping engine 206, the example customer data retriever 208, the example LERG interface 210, the example subscriber activity system interface 212, and/or the example report generator 214 of FIGS. 1 and 2. For example, the processor platform P100 can be implemented by one or more general-purpose processors, processor cores, microcontrollers, etc.

The processor platform P100 of the example of FIG. 8 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 3, 4, 5A, 5B, 6A, 6B, and 7 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example working database 104 and/or the mapping database 106 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to identify subscriber activity, comprising:
   receiving a first set of service provider telephone number (TN) data associated with a service provider and a current time period;
   receiving a second set of service provider TN data associated with a first prior time period;
   receiving a first set of subscriber activity data associated with the current time period;
   identifying a TN that is in the first set of subscriber activity data, is present in the first set of service provider TN data, is absent from the second set of service provider TN data, and is present within a threshold number of subscriber activity data sets associated with prior time periods; and
   identifying the TN as a winback for the service provider when the TN is owned by the service provider at the current time period.

2. A method as defined in claim 1, further comprising querying a local exchange and routing guide to determine ownership of a TN block associated with the TN when an activity code comprises at least one of an add-event or a change-event.

3. A method as defined in claim 2, further comprising identifying the TN as a new inroad for a competitor when the TN block is not owned by the service provider.

4. A method as defined in claim 2, further comprising querying a local number portability data source to determine an operating carrier name (OCN) of the TN when the TN block is owned by the service provider.

5. A method as defined in claim 4, further comprising identifying the TN as a new inroad for the service provider when the OCN is indicative of service provider ownership.

6. A method as defined in claim 4, further comprising identifying the TN as a new inroad for a competitor when the OCN is indicative of competitor ownership.

7. A method as defined in claim 1, further comprising identifying the TN as a disconnect when an activity code comprises a disconnect event.

8. A method as defined in claim 1, further comprising determining whether the TN is present within a second set of subscriber activity data, present within the first set of service provider TN data, and absent from the second set of service provider TN data.

9. A method as defined in claim 8, further comprising querying a local exchange and routing guide to determine ownership of a TN block associated with the TN when the TN is not present within the threshold number of subscriber activity data sets associated with prior time periods.

10. A method as defined in claim 9, further comprising identifying the TN as a competitive gain for the service provider when the TN block ownership is associated with the competitor.

11. A method as defined in claim 9, wherein the threshold number of subscriber activity data sets is a first threshold number of subscriber activity data sets and further comprising identifying the TN as a new inroad for the service provider when disconnect activity codes are absent from a second threshold number of subscriber activity data sets associated with prior time periods.

12. A method as defined in claim 8, further comprising querying a local exchange and routing guide to determine ownership of a TN block associated with the TN when the TN is present within the threshold number of subscriber activity data sets associated with prior time periods.

13. A method as defined in claim 12, further comprising identifying the TN as a client winback when the TN block ownership is associated with the service provider.

14. A method as defined in claim 12, further comprising identifying the TN as a competitive gain for the service provider when the TN block ownership is associated with the competitor.

15. An apparatus to identify subscriber activity, comprising:
   a customer data retriever to retrieve service provider telephone number (TN) data, the service provider TN data comprising a current time period data set and prior time period data sets;

a subscriber activity system interface to retrieve subscriber activity data associated with the current time period and prior time periods; and a process engine to:

identify a TN that is present in the subscriber activity data associated with the current time period, present in the service provider TN data during the current time period, absent from the service provider TN data during a first one of the prior time periods, and present within a threshold number of subscriber activity data sets associated with prior time periods; and associate the TN with a winback status when the TN is owned by the service provider at the current time period.

16. An apparatus as defined in claim 15, further comprising a local exchange and routing guide (LERG) interface to query a LERG database, the LERG interface to initiate a query in response to the subscriber activity system interface identifying at least one of an add-event or a change-event associated with the TN, the query to determine ownership of a TN block associated with the TN.

17. An apparatus as defined in claim 16, further comprising a local number portability (LNP) engine to query an LNP database, the LNP engine to initiate a query in response to determining that the TN block is owned by the service provider, the query to determine an operating carrier name (OCN) associated with the TN.

18. An apparatus as defined in claim 17, wherein the process engine identifies the TN as a new inroad for the service provider when the OCN is indicative of service provider ownership.

19. An apparatus as defined in claim 17, wherein the process engine identifies the TN as a new inroad for a competitor when the OCN is indicative of competitor ownership.

20. A tangible machine readable storage device or storage disk comprising instructions that, when executed, cause the machine to at least:

receive a first set of service provider telephone number (TN) data associated with a service provider and a current time period;

receive a second set of service provider TN data associated with a first prior time period;

receive a first set of subscriber activity data associated with the current time period;

identify a TN that is in the first set of subscriber activity data, is present in the first set of service provider TN data, is absent from the second set of service provider TN data, and is present within a threshold number of subscriber activity data sets associated with prior time periods; and identify the TN as a winback for the service provider when the TN is owned by the service provider at the current time period.

21. A tangible machine readable storage device or storage disk as defined in claim 20, wherein the instructions cause the machine to query a local exchange and routing guide to determine ownership of a TN block associated with the TN when an activity code comprises at least one of an add-event or a change-event.

22. A tangible machine readable storage device or storage disk as defined in claim 21, wherein the instructions cause the machine to query a local number portability data source to determine an operating carrier name (OCN) of the TN when the TN block is owned by the service provider.

* * * * *